United States Patent Office 3,091,619
Patented May 28, 1963

3,091,619
NITROGEN DERIVATIVES OF FLUOROALKYL SULFONIC ACID SULTONES
Hugh Harper Gibbs, Wilmington, Del., assignor to E. I. du Pont de Nemours and Company, Wilmington, Del., a corporation of Delaware
No Drawing. Filed May 1, 1958, Ser. No. 732,115
2 Claims. (Cl. 260—327)

This invention relates to novel perfluoroalkyl sulfur-nitrogen compounds and more particularly to novel ammonia derivatives of perfluoro- and omega-hydroperfluoro-α-sulfocarboxylic acids which are highly useful surface active agents. This application is a continuation-in-part of copending patent application Serial No. 702,248, filed December 12, 1957, now abandoned.

The novel fluorocarbon dispersing agents of the present invention have the general formula

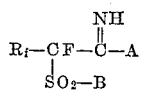

wherein A is a member of the class consisting of oxygen, amine and imine radicals, B is a member of the class consisting of amine, imine and oxygen radicals, said A and B being combined in a single radical where said radical is a divalent radical, and wherein $R_f$ is a member of the class consisting of fluorine, perfluoroalkyl and omega-hydroperfluoroalkyl radicals.

The novel fluorocarbon sulfur-nitrogen dispersing agents of the present invention are obtained by reaction of a fluoroalkyl sulfonic acid sultone having the general structural formula

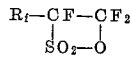

and its base catalyzed rearrangement product, the 2-fluorosulfonylfluoroacyl fluoride, having the general formula

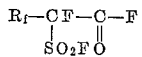

where $R_f$ in both instances is a fluorine, a perfluoroalkyl or an omega-hydroperfluoroalkyl radical with ammonia or an ammonia forming derivative. The reaction with ammonia is generally carried out in an inert organic solvent such as an ether or ester. Fluorocarbon solvents such as perfluoroalkanes and perfluorocycloalkanes are also highly useful solvents. Due to the exothermic nature of the reaction of the sultone or diacid fluoride with ammonia, the reaction is generally carried out at temperatures below room temperature.

The perfluoroalkyl sulfonic acid sultones employed in the present invention as starting materials for the formation of the novel fluorocarbon compounds of the present invention are formed by the reaction of α-perfluoroolefins or omegahydroperfluoroolefins with sulfur trioxide. The perfluoroalkyl sulfonic acid sultones may also be referred to as 3-perfluoroalkyl-3,4,4-trifluoro-2,2-dioxo-1,2-oxathietanes. The formation of the sultone or 2,2-dioxo-1,2-oxathietane, by reaction of sulfur trioxide with the olefin, occurs on admixture at room and elevated temperatures in the absence of a solvent or reaction medium. The rearrangement of the sultone to the 2-fluorosulfonyl perfluoroacyl fluoride results from the addition of trace quantities of triethylamine or ammonia to the sultone. The reaction is exothermic and occurs instantaneously on the addition of the triethylamine.

The preparation of the sultone and fluorosulfonyl acyl fluoride is further demonstrated by the following examples:

A mixture of 42.7 g. (10% excess) of freshly distilled sulfur trioxide and 170 g. of perfluoroheptene-1 was charged into a 327 ml. platinum lined pressure vessel. The mixture was heated for 3 hours under autogenous pressure at 150° C. The reactor was cooled, pressured with nitrogen to 200 p.s.i., inverted and discharged. The crude product from three such runs was combined and distilled through a 30″ spinning band column at atmospheric pressure. The perfluoroheptene-1 sultone (3-perfluoropentyl-3,4,4-trifluoro-2,2-dioxo-1,2-oxathietane) distilled at a temperature of 134.5 to 136.5° C. There was obtained 201 ml., 364 g., of the sultone corresponding to a yield of 58%.

Analysis.—Calculated for $C_7F_{14}O_3S$: C, 19.6%; F, 61.8%; S, 7.4%. Found: C, 20.1%, 20.0%; F, 59.5%, 57.9%; S, 7.8%, 7.6%. Index of refraction at 23° C.: 1.30823.

To 57 g. of the perfluoroheptene-1 sultone contained in a flask equipped with reflux condenser was added 3 drops of triethylamine. Immediate exothermic reaction occurred. The reaction mixture was refluxed for 2 hours and then distilled through a 12″ spinning band column. The 2-fluorosulfonyl perfluoroheptanoyl fluoride distilled at a temperature of 134.2 to 134.5° C. at atmospheric pressure. There was obtained 29.6 ml., 51.5 g., of the pure product corresponding to a 90% yield. The product had an index of refraction at 26° C. of 1.30614.

Analysis.—Calculated for $C_7F_{14}O_3S$: C, 19.6%; F, 61.8%; S, 7.4%. Found C, 19.2%; F, 58.8%; S, 7.5%.

The structures of both the sultone and fluorosulfonyl acyl fluoride were confirmed by infrared and nuclear magnetic resonance analyses.

The preparation of the novel compounds and dispersing agents of the present invention is illustrated by the following examples which also show the preparation of some of the intermediate ammonia derivatives:

Example I

Into a solution of 25 g. of the perfluoroheptene-1 sultone (3 - perfluoropentyl-3,4,4-trifluoro - 2,2 - dioxo-1,2-oxathietane) in 100 ml. perfluorodimethylcyclobutane maintained at 0° C. was bubbled $NH_3$ over a period of 15 hours. A cream colored precipitate formed which on isolation and drying weighed 26.3 g.

A 15.2 g. sample of this product was extracted with 200 ml. of ethyl acetate. On filtering, evaporating and drying a 7.0 g. sample of the resulting product was sublimed giving rise to 5.13 g. of 3-perfluoropentyl-3-fluoro-4-imino-2,2-dioxo-1,2-oxathietane having the structure

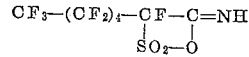

The material was found to have a melting point at 121 to 123° C., although changes in the crystal structure occur in the range of 95–105° C.

Analysis.—Calculated for $C_7F_{12}HSO_3N$: C, 20.6%; F, 56.0%; N, 3.4%; S, 7.9%. Found: C, 18.9%; F. 55.6%; N, 4.6%; S, 7.9%.

Infrared analysis of the compound showed strong absorption at 6.13 and 6.45 microns, corresponding to the imine structure (C=N and N—H). A saturated aqueous solution (<0.1%) of this compound was found to reduce the surface tension to 19 dynes/cm.

Example II

Into a solution of 25.0 g. of α-fluorosulfonyl perfluoroheptanoyl fluoride in 100 ml. of diethyl ether maintained at 0–5° C. was bubbled ammonia for a period of one hour. A white precipitate formed which was isolated by evaporation. The product was taken up in 250 ml. of ethyl acetate, filtered and evaporated to dryness. A mixture of products weighing 21 g. was obtained.

A 1.2 g. sample of the product mixture was dissolved in 3 ml. of boiling ethanol and a few drops of ether was added to the hot solution until a crystalline precipitate began to form. The reaction mixture was cooled, the crystalline solid filtered and dried. There was obtained 0.84 g. of α-sulfamylperfluoroheptanamidine having the structure:

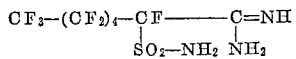

and a crystalline melting point at 143–147° C.

*Analysis.*—Calculated for $C_7F_{12}H_5SO_2N_3$: C, 19.9%; F, 53.9%; N, 9.9%; S, 7.6%. Found: C, 19.3%; F, 51.0%; N, 9.5%; S, 7.7%.

*Example III*

Into a solution of 25 g. of 2-fluorosulfonyl perfluoroheptanoyl fluoride in 150 ml. of perfluorodimethylcyclobutane cooled to 0° C. was bubbled ammonia over a 30 minute period while the reaction mixture was agitated. The reaction mixture was then evaporated and 24.8 g. of a crude α-fluorosulfonyl perfluoroheptanamide was isolated. The solid was extracted with 100 ml. of ethyl acetate, the ethyl acetate evaporated off and the resulting product dried over phosphorus pentoxide in a vacuum. The extracted product was recrystallized from p-xylene. There was obtained 10.8 g. of purified α-fluorosulfonyl perfluoroheptanamide having a melting point at 105 to 110° C.

*Analysis.*—Calculated for $C_7F_{13}H_2SO_3N$: C, 19.6%; F, 57.8%; N, 3.3%; S, 7.5%. Found: C, 19.8%; F, 56.0%; N, 3.7%; S, 6.9%.

A 10.0 g. sample of the α-fluorosulfonyl perfluoroheptanamide was sublimed by heating under vacuum. The product so obtained was resublimed twice more resulting in 5.6 g. of 4-perfluoropentyl-4-fluoro-1,1,3-trioxo-1,2,-thiazetidine having the structural formula

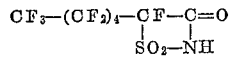

and a melting point at 80 to 102° C.

*Analysis.*—Calculated for $C_7F_{12}HSO_3N$: C, 20.6%; F, 56.0%; N, 3.4%; S, 7.9%. Found: C, 20.2%; F, 55.7%; N, 3.8%; S, 9.0%.

An aqueous saturated solution (<0.05%) of the thiazetidine reduced the surface tension to 20 dynes/cm.

Infrared analysis and nuclear magnetic resonance analysis confirmed the above described structure. A 0.15% aqueous solution of this compound reduced the surface tension to 45 dynes/cm.

Sublimation of the above product mixture gave rise to the formation of 3-perfluoropentyl-3-fluoro-4-imino-2,2-dioxo-1,2-oxathietane.

*Example IV*

Perfluoroheptene-1 sultone (60 g.) was dissolved in 250 ml. of diethyl ether contained in a round-bottomed flask equipped with a thermometer, mechanical stirrer, condenser and gas inlet tube. The solution was cooled to 3° C. and excess ammonia bubbled in over a 170-minute period. The temperature rose rapidly to 18° C., then cooled back down again to the original temperature. The white, insoluble product, α-sulfamylperfluoroheptanamidine, was separated by filtration and washed with ether. The ether insoluble material (62.5 g.) was dissolved in 600 ml. of hot water, treated with charcoal, filtered, cooled to room temperature and acidified with 50 ml. of 1:1 hydrochloric acid-water mixture. The white gelatinous product was filtered and dried overnight in a vacuum oven at 50° C. There was obtained 48.1 g. of an amorphous white material, M.P. 175–185° C. The crude product was purified by vacuum sublimation followed by two recrystallizations from p-xylene. The purified product softened at 164° and melted at 176–178° C. and was identified to be 4-perfluoropentyl-4-fluoro-3-imino-1,1-dioxo-1,2-thiazetidine.

*Analysis.*—Calculated for $C_7H_2F_{12}N_2O_2S$: N, 6.9%; S, 7.9%; mol. wt. 406. Found: N, 6.8%, 6.9%; S, 7.4%, 7.8%; mol. wt. 412, 378.

The infrared spectrum showed bands at $5.85\mu$ (C=N), 6.28 and $6.44\mu$ (N—H deformation).

The surface tension of a saturated solution (<0.05%) was 44 dynes/cm. at 25° C.

*Example V*

Hexafluoropropylene sultone (30 g.) was dissolved in 200 ml. of diethyl ether contained in a round-bottomed flask equipped with a thermometer, mechanical stirrer, condenser and gas inlet tube. The solution was cooled to 2° C. Excess ammonia was then bubbled in over a 90 minute period. The temperature rapidly rose to 18° C., but after about 30 minutes fell again to 5° C. where it remained for the rest of the reaction time. A finely divided, white, amorphous precipitate, α-sulfamyl-perfluoropropionamidine, formed. After the ether had been evaporated off at room temperature by an air jet, the sticky residue was extracted with 20 ml. of ethyl acetate. The insoluble ammonium fluoride was separated by filtration through a fluted filter paper. The clear, colorless filtrate was cooled to 8° C. and acidified with hydrogen chloride. A milky emulsion immediately formed. The ethyl acetate was evaporated off at 50° C. using a nitrogen jet. The glassy residue was then extracted consecutively with ethanol ethyl acetate and water with evaporation to dryness after each extraction. The final product was dried in a vacuum oven at 50° C. for 48 hours. There was obtained 3.4 g. of 4-trifluoromethyl-4-fluoro-3-imino-1,1-dioxo-1,2-thiazetidine, M.P. 54–60° C., having the formula

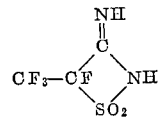

The infrared spectrum showed strong bands at $5.83\mu$ (C=N), 6.24 and $6.45\mu$ (N—H deformation).

The foregoing examples have illustrated in detail the novel dispersing agents and compounds that are obtained by the reaction of ammonia or ammonia-forming compounds with the sultone obtained from the reaction of a fluorinated olefin with sulfur trioxide. The examples have further shown that the formation of these reaction products is not limited to any particular fluoroolefin but is obtained with terminally unsaturated perfluoroolefins generally. Omega-hydroperfluoroolefins which are identical in their reaction behavior to the perfluoroolefins may be similarly used to form the novel products of the present invention. Thus suitable olefins for the preparation of the products of the present invention are tetrafluoroethylene, hexafluoropropylene, perfluorobutene-1, perfluoropentene-1, omega-hydroperfluorohexene-1, perfluoroheptene-1, omega hydroperfluorooctene-1, perfluorononene-1, omega-hydroperfluorononene-perfluorododecene-1, perfluorooctadecene-1, etc.

The novel perfluoroolefin sultone ammonia derivatives of the present invention are useful in a number of important applications. As shown by the reduction in surface tension obtained with the novel compounds of the present invention, they are highly useful as surface active agents and dispersing agents. Particularly those ammonia derivatives, where the perfluoroolefin has more than 6 carbon atoms in the chain are outstanding. The ammonia derivatives of perfluorosultones of the present invention are furthermore highly useful as fire-extinguisher aids in organic solvent fires where water by itself is not effective. The compounds of the present invention find further application as water evaporation retardants.

I claim:

1. A fluoroalkyl-3-fluoro-4-imino-2,2-dioxo-1,2-oxathietane having the structure

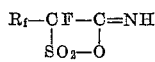

where $R_f$ is a member of the class consisting of fluorine, perfluoroalkyl and omega-hydroperfluoroalkyl radicals, said alkyl radicals having from one to five carbon atoms.

2. The oxathietane of claim 1 where $R_f$ is perfluoropentyl.

References Cited in the file of this patent

UNITED STATES PATENTS

| | | |
|---|---|---|
| 2,732,398 | Brice et al. | Jan. 24, 1956 |
| 2,759,019 | Brown | Aug. 14, 1956 |
| 2,808,425 | Haszeldine | Oct. 1, 1957 |
| 2,852,554 | England | Sept. 16, 1958 |

OTHER REFERENCES

Jiang: Hua Hsueh Hsueh Pao, vol. 23 (1957), page 339.

Robert C. Krug et al.: J. Org. Chem., vol. 23, February 1958, pages 212–15